United States Patent
Ehbing et al.

(10) Patent No.: US 8,389,590 B2
(45) Date of Patent: *Mar. 5, 2013

(54) PROCESS AND INSTALLATION FOR THE PRODUCTION OF FOAM IN A CONTINUOUS FOAMING PROCESS

(75) Inventors: Hubert Ehbing, Odenthal (DE); Holger Zien, Köln (DE); Rainer Rauhaus, Solingen (DE); Johann Frei, Jona (CH)

(73) Assignee: Bayer Intellectual Property GmbH, Monheim (DE)

( * ) Notice: Subject to any disclaimer, the term of this patent is extended or adjusted under 35 U.S.C. 154(b) by 2046 days.

This patent is subject to a terminal disclaimer.

(21) Appl. No.: 11/295,269

(22) Filed: Dec. 6, 2005

(65) Prior Publication Data

US 2006/0128820 A1    Jun. 15, 2006

(30) Foreign Application Priority Data

Dec. 11, 2004  (DE) .......................... 10 2004 059 724

(51) Int. Cl.
   *C08G 18/08*   (2006.01)
(52) U.S. Cl. ...................................... 521/170; 521/174
(58) Field of Classification Search .................. 521/170, 521/174
   See application file for complete search history.

(56) References Cited

U.S. PATENT DOCUMENTS

| | | | |
|---|---|---|---|
| 4,422,988 A | 12/1983 | Komylak | 264/40.3 |
| 4,492,664 A | 1/1985 | Bruno | 264/46.2 |
| 4,970,243 A | 11/1990 | Jacobs et al. | 521/155 |
| 5,209,881 A | 5/1993 | Charbonnet | 264/25 |
| 5,512,602 A | 4/1996 | Horn et al. | 521/114 |
| 5,582,840 A | 12/1996 | Pauw et al. | 425/4 C |
| 5,604,267 A | 2/1997 | Duffy | 521/133 |
| 5,804,113 A | 9/1998 | Blackwell et al. | 264/51 |
| 5,814,676 A | 9/1998 | Jacobs et al. | 521/174 |
| 5,859,081 A | 1/1999 | Duffy | 521/133 |
| 5,863,961 A | 1/1999 | Jacobs et al. | 521/174 |
| 5,914,884 A | 6/1999 | Gur Ali et al. | 364/475.05 |
| 6,107,355 A | 8/2000 | Horn et al. | 521/51 |
| 7,138,077 B2 * | 11/2006 | Ehbing et al. | 264/40.4 |
| 2004/0065973 A1 | 4/2004 | Ehbing et al. | 264/40.4 |

FOREIGN PATENT DOCUMENTS

DE           28 19 709 B1          10/1979

OTHER PUBLICATIONS

Journal of Cellular Plastics, vol. 33, Mar. 1997, p. 102-126, Salvatore Consoli, "Software to Manage a Continuous Production of Flexible Polyurethane Foams by Slabstock Technology".
Polyurethane 1995, Sep. 26-29, 1995, p. 489-490, James D. Shoup, "Foam Roadmap On-Line Answernostics".
Adv. Urethane Sci. Techn., 14 (month unavailable) 1998, pp. 1-43, Reinhart Schiffauer, "Mathematical Property Prediction Models for Flexible Polyurethane Foams".
Kunststoffe, vol. 88, Oct. 1998, F. Schnabel und K.-H. Dörner, "Experten mit System, Prozeßsteuerung des PUR-RRIM-Verfahrens zur Herstellung von Karosserieaußenteilen".
Kunststoffe, vol. 91, Apr. 2001, Karl-Heinz Dörner, Hans Joachim Meiners, Hans-Joachim Ludwig, "PUR-Teile Kostengünstig fertigen Stand der Polyurethan-RRIM-Technik".

* cited by examiner

*Primary Examiner* — John Cooney
(74) *Attorney, Agent, or Firm* — Novak Druce Connolly Bove + Quigg LLP

(57) ABSTRACT

The invention relates to an installation and to a process for the production of foam in a continuous foaming process with the following steps,
measuring actual surface temperatures of the foam or the facing layers along a conveying direction and
determining a control variable for the foaming process as a function of a deviation of the actual surface temperatures from the nominal surface temperatures.

18 Claims, 2 Drawing Sheets

US 8,389,590 B2

PROCESS AND INSTALLATION FOR THE PRODUCTION OF FOAM IN A CONTINUOUS FOAMING PROCESS

FIELD OF THE INVENTION

The invention relates to a process and to an installation for the production of foam in a continuous foaming process, in particular for the production of polyurethane foam.

BACKGROUND OF THE INVENTION

The quality of foam is dependent on a plurality of environmental and installation parameters. This applies in particular to the production of polyurethane foam.

Various computer-aided processes for quality assurance in the production of polyurethane foam have become known, such as for example from "Software to Manage a Continuous Production of Flexible Polyurethane Foams by Slabstock Technology", Salvatore Consoli, *Journal of Cellular Plastics*, volume 33, March 1997, page 102, "Foam Roadmap On-Line Answemostics", James D. Shoup, Polyurethane 1995, Sep. 26-29, 1995, pages 489, 490 and "Mathematical Property Prediction Models for Flexible Polyurethane Foams", Reinhart Schiffauer, *Adv. Urethane Sci. Techn.*, 14 (1998), pages 1 to 44.

Expert systems for processing process parameters in RIM processing have also been disclosed by "Experten mit System, Prozesssteuerung des PUR-RRIM-Verfahrens zur Herstellung von Karosserieaußenteilen" [Experts with system; process control of the PU-RRIM process for the production of exterior bodywork parts], F. Schnabel, Sulzbach, K.-H. Dörner, Kunststoffe, volume 88, October 1998 and "PUR-Teile kostengünstig fertigen, Stand der Polyurethan-RRIM-Technologie" [Low-cost production of PU parts, status of polyurethane RRIM technology], Karl-Heinz Dörner, Hans Joachim Meiners, Hans-Joachim Ludwig, Kunststoffe, volume 91, April/2001. These expert systems are apparently able to make predictions with regard to product properties, process monitoring, quality assurance and preventive maintenance.

DE 28 19 709 B1 furthermore describes a process for the continuous production of foam sheets provided with facing layers, in which foam thickness is measured with ultrasound transversely to the conveying direction. The production installation is then controlled via conveyor belt speed and/or the applied quantity of foam.

DE 102 37 005 A1 describes a process for a continuous slabstock foam process, in which the actual rise heights are continuously measured along the conveying apparatus. A control variable for controlling the slabstock foam process is determined as a function of possible deviations between the actual rise heights and predetermined nominal rise heights.

Temperature measurement methods, in particular contactless temperature measurement, have long been known in the art. Pyrometers are used to evaluate the infrared radiation emitted from the measured object. In this manner, the surface temperature of for example continuous belt installations, plastics extruders, conveyor belts or calenders may be monitored contactlessly.

Different types of installation for the production of slabstock foam and other foams are also known in the art. Examples are the Planiblock, UBT, QFM, Draka-Petzetakis, Maxfoam, Vertifoam Edge Control and VPF processes. In these types of installations, flexible polyurethane foam is produced in a continuous rectangular process. Rigid foam composite sheets with flexible or rigid facing layers are produced on continuously operated double conveyor installations.

DE 691 19 244 T2, DE 692 17 671 T2 and U.S. Pat. No. 4,492,664 A furthermore disclose various apparatuses for the continuous production of polyurethane foam blocks. DE 696 10 885 T2 discloses another apparatus for the production of polyurethane foam. DE 38 19 940 A1, DE 196 49 829 A1, DE 43 15 874 A1 and DE 195 06 671 C2 disclose various processes for the production of polyurethane foams on such installations.

SUMMARY OF THE INVENTION

The present invention provides an improved process for the production of foam in a continuous slabstock foam process and an improved installation for the production of foam in such a process.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
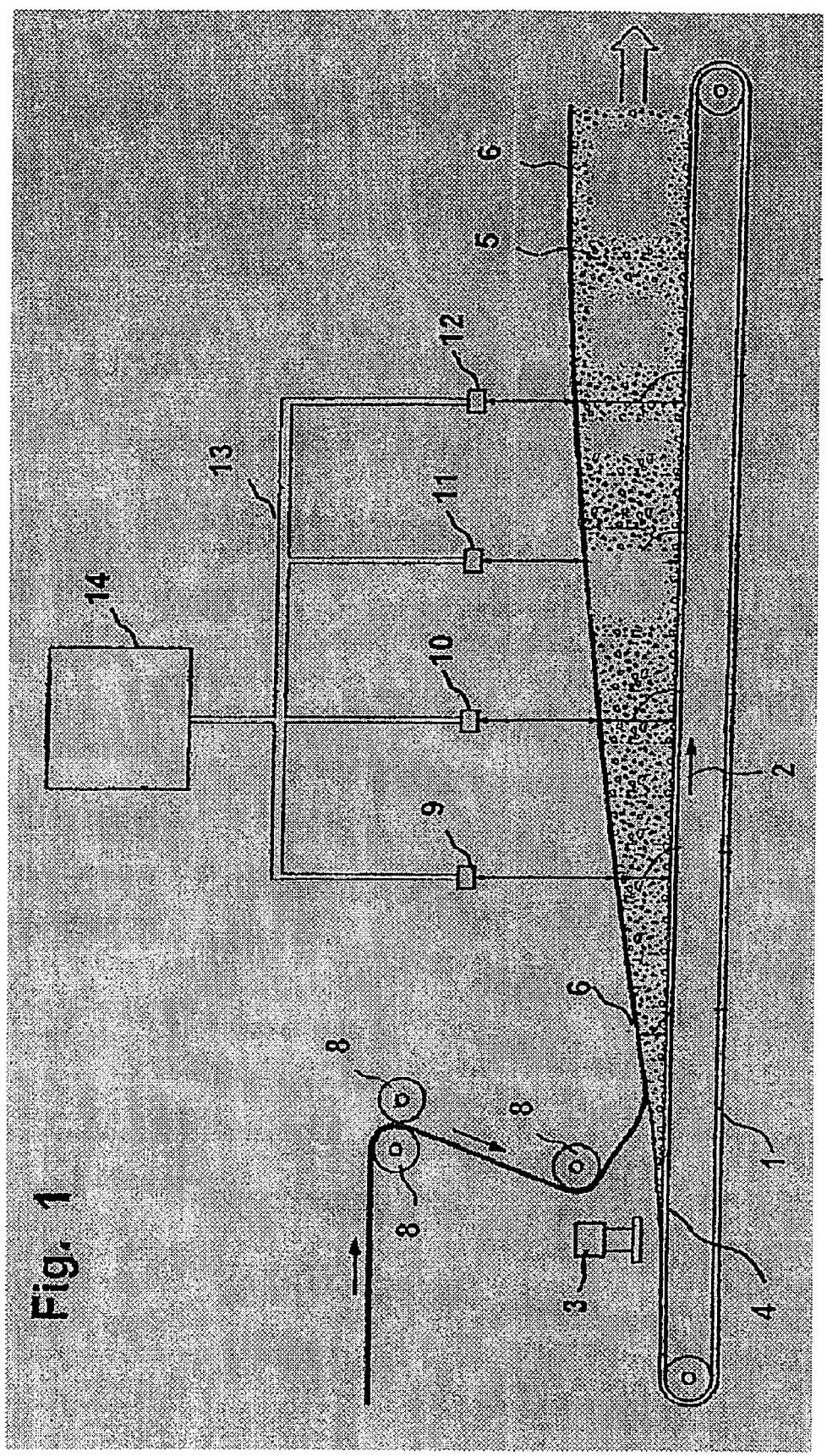
FIG. 1 shows a schematic diagram of an embodiment of the invention in a continuous slabstock foam process.

The present invention will now be described for purposes of illustration and not limitation. Except in the operating examples, or where otherwise indicated, all numbers expressing quantities, percentages and so forth in the specification are to be understood as being modified in all instances by the term "about.".

The present invention provides a process for the production of foam in a continuous foaming process involving measuring actual surface temperatures of the foam or facing layers along a conveying direction and determining a control variable for the foaming process as a function of a deviation of actual surface temperatures from nominal surface temperatures.

The present invention further provides an installation for the production of foam in a continuous foaming process having a means for measuring actual surface temperatures of the foam or facing layers along a conveying direction and a means for determining a control variable for slabstock foam process as a function of a deviation of the actual surface temperatures from predetermined nominal surface temperatures.

The present invention permits improved monitoring and improved control of the production of foam in a continuous foaming process by measuring the actual surface temperatures of the foam at a plurality of points along the expansion zone of the foam in the installation. The actual surface temperatures are compared with corresponding nominal surface temperatures. A control variable for readjusting the process is determined from any possible deviation between the actual and nominal surface temperatures.

Because the heat of reaction of the foam also increases the temperature of the facing layers, the temperatures of the base plate or of the top plate or of the base paper on the side remote from the foam may alternatively and/or additionally be measured along the conveying direction by contacting or contactless methods. The temperature of the mixing head may additionally be measured contactlessly with an infrared pyrometer or with a contact thermometer.

It is particularly advantageous in this connection that qualitative and quantitative monitoring of the foaming process may be achieved immediately after application of the reaction mixture. On the other hand, during ongoing production of the foam, installation parameters and/or the composition of the starting material for the foam may be readjusted to obtain a maximally constant desired foam quality. In this manner, fluctuations in product properties, such as for example the density and compressive strength of the foam, due to varying process parameters and environmental conditions, such as for example air pressure, may be reduced. This has the further advantage that the installation may be started up more quickly and wastage is reduced.

According to an embodiment of the invention, production of the foam proceeds in an installation of the Hennecke, Planiblock, Draka-Petzetakis, Maxfoam, Vertifoam, Edge Control or VPF type or a double conveyor installation. Such installations conventionally have a conveyor apparatus on which the expanding foam is moved in a conveying direction. A "fall plate" is sometimes present in the foam expansion zone.

A plurality of temperature sensors may be arranged in the foam expansion zone along the conveying direction in order to measure the actual surface temperature at different points in the expansion zone. Contactless infrared pyrometers, which permit measurement of the actual surface temperature of the foam, are preferably used for this purpose. The temperatures of the base plate or of the top plate or of the base paper may alternatively or additionally be measured by contacting or contactless methods.

A regression curve may be plotted from the measured actual surface temperature of the foam, which curve is compared with a nominal curve. For example, the difference in the gradients of the curves or the difference in the integrals of the curves in the expansion zone is used as the basis for determining a control variable.

The conveying speed of the expanding foam may serve as a control variable. If, for example, the actual surface temperatures are below the nominal surface temperatures, the conveying speed is reduced until there is an adequate match between the actual temperatures and the nominal temperatures.

The quantity of material fed into the slabstock foam process per unit time may also serve as a control variable. If, for example, the actual surface temperatures are below the nominal surface temperatures, the quantity of material fed per unit time is increased until there is an adequate match between the actual and the nominal surface temperatures.

The chemical composition of the material fed to the slabstock foam process may serve as a control variable. If, for example, the actual surface temperatures are below the nominal surface temperatures of the foam, the chemical composition is modified until there is an adequate match between the actual surface temperatures and the nominal surface temperatures. In particular, the quantity of catalyst and/or water may be varied.

The temperature of the reaction components may also serve as a control variable. If, for example, the actual surface temperatures are below the nominal surface temperatures of the foam, the temperature of the reaction components is increased until there is an adequate match between the actual and the nominal surface temperature of the foam.

The temperature of the fall plate or of the pouring plate may serve as a control variable. If, for example, the actual surface temperatures are below the nominal surface temperatures of the foam, the temperature of the fall plate or pouring plate is increased until there is an adequate match between the actual and the nominal surface temperature of the foam.

The temperature of the preferably metallic facing layers may serve as a control variable. If, for example, the actual surface temperatures are below the nominal surface temperatures of the foam, the temperature of the facing layers is increased until there is an adequate match between the actual and the nominal surface temperature of the foam.

Various control variables may be determined on the basis of a deviation of the actual surface temperature from the nominal surface temperature of the foam or of the actual temperature profile of the facing layers from the nominal temperature profile of the facing layers, such as for example a change in conveying speed, the temperature of the pouring plate or the facing layers, the quantity of material fed per unit time and/or the chemical composition of the fed material.

According to another embodiment of the invention, at least one product property of the resultant foam may be predicted on the basis of the actual surface temperature of the foam. This prediction may be made using a rigorous regression model. Alternatively or additionally, a neural network or a hybrid neural network may be used for the prediction.

The foaming behavior of the foam may be predicted on the basis of the actual temperature of the foam. In particular for the production of rigid foam composite sheets, the flow behavior and "dragging" of the foam directly beneath the upper facing layer is an important process variable. This prediction may be made using a rigorous regression model. Alternatively or additionally, a neural network or a hybrid neural network may be used for the prediction.

According to another embodiment of the invention, the actual surface temperatures of the foam, the chemical composition of the fed material and installation and/or environmental parameters may be supplied to the neural network as input variables. On the basis thereof, the neural network predicts at least one product property, such as for example density, compressive strength or strength.

Such a neural network may here be trained by carrying out a series of tests to measure a product property which is to be predicted as a function of variation in the input variables. The neural network is then trained on the basis of the resultant data, i.e. the actual parameters, surface temperatures of the foam, rise heights, composition, installation and/or environmental parameters are input into the neural network. The product property predicted by the neural network is compared with the actually measured product property. On the basis of the difference between the predicted product property and the actual product property, the weighting of the neurons is adjusted, i.e. the neural network is trained.

This training of the neural network may alternatively or additionally proceed during ongoing production, i.e. in this case a series of tests is not carried out, but instead production data are collected for a certain period of for example one year and used to train the neural network.

The predicted product properties may also serve to classify the quality of the foam produced. Predicted quality levels are, for example, stored in a database.

Zones of low quality can be identified in the foam produced on the basis of the prediction of at least one product property. Such zones may be cut out of the foam blocks. In comparison with the art, this has the advantage that less waste material is produced.

For example, in continuous foam production, blocks of for example 6 m in length are cut from the foam strand. In the prior art, the individual blocks are then subjected in succession to quality testing. In contrast, the invention makes it possible to cut out zones from the foam strand which have been predicted to be of lower quality, such that blocks of a length of, for example 6 m, are obtained which are of a uniform predicted quality. Classification into different quality levels is also possible here.

FIG. 1 shows an installation for the production of foam, in particular of polyurethane foam, in a continuous slabstock foam process.

The installation has a conveyor belt 1 which is set in motion in the conveying direction 2. At the beginning of the conveyor belt 1, a mixing head 3 is arranged above the conveyor belt 1. The mixing head 3 serves to apply a reactive chemical system onto the pouring plate 4 of the conveyor belt 1. The reactive chemical system contains a foaming mixture, for example for the production of polyurethane foam.

The reactive chemical mixture expands on the conveyor belt 1, such that an expansion zone with expanding foam 5 is obtained. Cover paper 6, which is guided by rollers 8, is applied onto the foam surface.

Sensors 9, 10, 11 and 12 are arranged above the expansion zone. The sensors serve to measure the surface temperature of the foam. Sensors 9, 10, 11 and 12 are in each case connected with a bus system 13. The bus system 13 is connected with a controller 14. The controller 14 accordingly receives the measurement signals from the sensors 9, 10, 11 and 12 via the bus system 13. On the basis of these measurement signals, the controller 14 determines a control variable for readjusting the foaming process. For example, the speed of the conveyor belt 1 and/or the quantity of reactive chemical system fed via the mixing head 3 per unit time and/or the chemical composition of the system and/or the temperature of the pouring plate 4 serve as a control variable.

Figure 2:
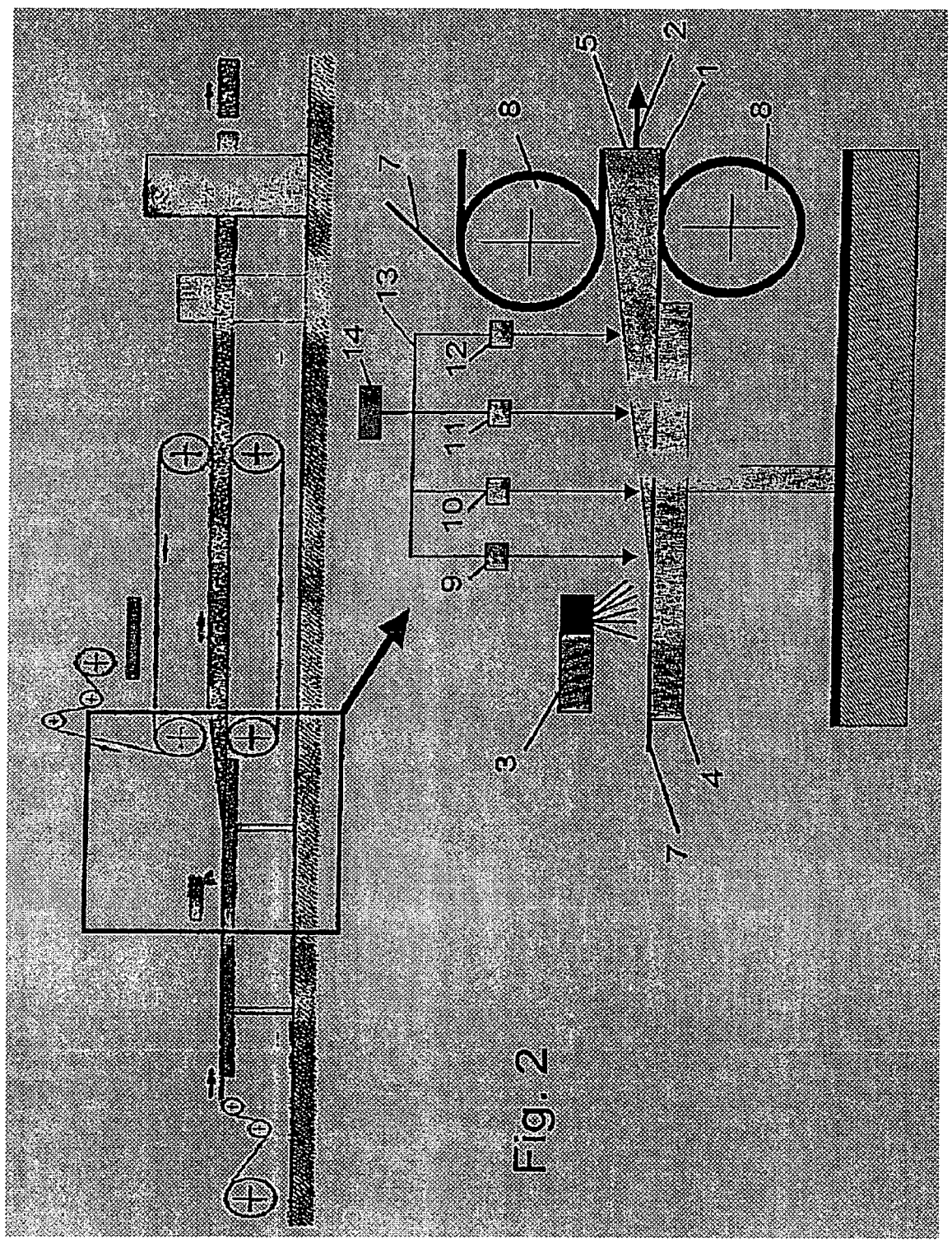
FIG. 2 depicts a schematic diagram of a preferred embodiment of the invention in a process for the production of rigid foam composite sheets with a double conveyor installation.

FIG. 2 shows an installation for the continuous production of polyurethane foam, in particular of rigid foam sheets with a double conveyor installation.

The installation has a conveyor belt 21 which is set in motion in the conveying direction 22. At the beginning of the conveyor belt 21, a mixing head 23 is arranged above the conveyor belt 21. The mixing head 23 serves to apply a reactive chemical system onto the pouring plate 24 of the conveyor belt 21. The reactive chemical system contains a foaming mixture, for example for the production of rigid polyurethane foam.

The reactive chemical mixture expands on the conveyor belt 21, such that an expansion zone with expanding foam 25 is obtained. The foam is here applied onto a lower, for example metallic, facing layer 27. A for example metallic facing layer 27 is likewise applied onto the upper side. The facing layers 27 may consist of flexible and/or rigid materials. Kraft paper, bitumenized paper, bitumen board, crepe paper, PE-coated glass fiber nonwovens and aluminum foils may be used as facing layers for insulating sheets. Structural elements with rigid facing layers on both sides are provided with facing layers of painted or coated steel or aluminum sheet or GRP. Composite sheets are obtained if rigid sheets (for example particle board, plasterboard, iber cement board, glass fiber sheet, rockwool or perlite sheets) are used as the bottom facing layer and a reelable facing layer is used on top. The facing layers are guided via rollers 28. In the conveyor channel, the foaming mixture reaches the upper facing layer 27. An exact sheet thickness is obtained thanks to the defined distance between the upper and lower conveyors.

Sensors 29, 30, 31 and 32 are arranged above the expansion zone. The sensors serve to measure the surface temperature of the foam in the expansion zone. Only in the initial expansion zone and before the foam reaches the upper facing layer 27 is the foam surface accessible to measuring instruments and the surface temperatures can be measured.

Sensors 29, 30, 31 and 32 are in each case connected with a bus system 33. The bus system 33 is connected with a controller 34. The controller 34 receives the measurement signals from the sensors 29, 30, 31 and 32 via the bus system 33. On the basis of these measurement signals, the controller 34 determines a control variable for readjusting the foaming process. For example, the speed of the conveyor belt 21 and/or the quantity of reactive chemical system fed via the mixing head 23 per unit time and/or the chemical composition of the system and/or the temperature of the pouring plate 24 and/or the temperatures of the raw material components and/or the temperature of the facing layers 27 serve as a control variable.

Control is effected by evaluating the difference between the actual and nominal temperatures. This may, for example, be achieved by plotting a regression curve from the instrumentally measured actual temperatures. This may involve linear regression or a polynomial, for example a spline polynomial or wavelet.

A control variable may be determined, for example, by making reference to the different gradients of the actual and nominal temperature curves, i.e. the difference between the curve gradients is formed. This difference is a measure of the deviation of the actual temperatures from the nominal temperatures.

The integrals of the actual and nominal temperature curves may alternatively or additionally be formed. The difference between the two integrals is in turn a measure of the deviation of the actual temperatures from the nominal temperatures.

The inflection points of the actual and nominal curves may alternatively or additionally be used to determine a control variable. In the case of flexible slabstock foam plants and of double conveyor installations, an S-shaped curve is typically obtained. The inflection point thereof may be used to determine the control variable.

A control variable for readjusting the foaming process is accordingly determined on the basis of the deviation of the actual from the nominal surface temperatures. If the measured surface temperature is greater than the nominal temperature, the speed of the conveyor belt 1, 21 (c.f. FIGS. 1 and 2) may, for instance, be increased in order to reduce the actual surface temperature at the measuring positions of sensors 9, 10, 11 and 12 (or 29, 30, 31 and 32) along the conveying direction 2 (or 22). The quantity of the reactive chemical system applied per unit time by the mixing head 3 (or 23) may alternatively or additionally also be reduced in order to reduce the actual surface temperatures. The composition of the reactive chemical system may furthermore alternatively or additionally be modified such that it foams more slowly in order consequently to reduce the actual surface temperatures at the measuring positions. The temperature of the pouring plate may alternatively or additionally be modified such that the reactive mixture foams more slowly in order consequently to reduce the actual surface temperatures at the measuring positions.

In the case of a double conveyor installation, the temperature of the facing layers may alternatively or additionally be modified such that the reactive mixture foams more slowly in order consequently to reduce the actual surface temperatures at the measuring positions. The temperature of the ovens in which the preferably metallic facing layers are preheated is preferably controlled for this purpose.

The temperature of the material fed to the mixing head may furthermore be used as a control variable. Through-flow heaters/coolers are preferably provided for this purpose in the feed lines to the mixing head in order to control the temperature of the components fed to the mixing head.

The rotational speed of the mixer which serves to mix the components by stirrer mixing may be used as a further control variable. Such a mixer or stirrer is arranged, for example, in the mixing head. A typical rotational speed of the mixer is 2,000 to 5,000 revolutions per minute.

The pressure of the components used for high pressure mixing of the components may be used as a further control variable. High pressure mixing is performed by compressing the polyol mixture and the isocyanate component typically to a pressure of between 120 and 200 bar.

The foaming process is controlled by the controller 14 (or 34). The controller 14 (or 34) contains a module for determining the actual rising curve. The controller 14 (or 34) furthermore includes a module for comparing the determined actual temperature curve with a stored nominal temperature curve. A statistic is obtained which provides a measure of the deviation of the actual temperature curve from the nominal temperature curve. This statistic is used to determine a control variable for readjusting the process.

The installation furthermore contains a computer system with a module for predicting further foaming behavior, for predicting at least one product property of the produced foam, a table for classifying the predicted quality of the produced foam and a database. The database may store the predicted product quality in the longitudinal direction of the slabstock foam, i.e. the predicted product quality for a specific point in the X direction of the slabstock foam is stored in the database.

The computer system receives the actual temperature curve as the input variable. Alternatively, only the measured actual surface temperatures are input. The determined statistic, which is a measure of the deviation between the actual and the nominal temperature curves, may furthermore be input into the computer system.

The further foaming behavior and/or one or more product properties of the foam currently being produced is/are predicted on the basis of these input values. The predicted product properties may be, for example, density, compressive strength or strength.

Quality is then classified by means of the predicted product properties by making reference to a table in which the admissible quality tolerance values for product properties are stored. The predicted product properties and the quality assigned thereto are then stored in the database for the foam currently being produced.

The foam obtained from the continuous foaming process is conventionally subdivided into blocks of, for example, 6 m in length. The installation has a cutting apparatus for this purpose. This cutting apparatus is preferably actuated by the computer system. If the computer system predicts a shorter section of the slabstock foam with a lower quality, the cutting apparatus is actuated to cut said section out of the slabstock foam. In this manner, wastage of the foaming process may be reduced.

A neural network is one embodiment of the prediction module. The input variables of the neural network are the actual surface temperatures, the composition of the reactive chemical system which is applied onto the conveyor belt 1 (or 21) by the mixing head 3 (or 23) (c.f. FIG. 1 or 2) and installation parameters, such as for example pressures and temperatures and preferably also environmental parameters, such as for example atmospheric pressure and atmospheric humidity. From these input variables, the neural network predicts one or more product properties and the further foaming behavior (for example "dragging"). The training data required for training the neural network may be obtained by separate series of tests or by recording data from actual production.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of foam in a continuous foaming process comprising:
    measuring actual surface temperatures of the foam or facing layers along a conveying direction; and
    determining a control variable for the foaming process as a function of a deviation of actual surface temperatures from nominal surface temperatures.

2. The process according to claim 1, wherein the foam is polyurethane foam.

3. The process according to claim 1, wherein the actual surface temperatures are measured by temperature sensors arranged along the conveying direction.

4. The process according to claim 1, wherein conveying speed is a control variable.

5. The process according to claim 1, wherein quantity of material fed into the foaming process per unit time is a control variable.

6. The process according to claim 1, wherein chemical composition of material fed to the foaming process is a control variable.

7. The process according to claim 1, wherein temperature of material fed to the foaming process is a control variable.

8. The process according to claim 1, wherein temperature of pouring plate is a control variable.

9. The process according to claim 1, wherein temperature of facing layers fed to the foaming process is a control variable.

10. The process according to claim 1, wherein pressure of the reaction components in high pressure mixing is a control variable.

11. The process according to claim 1, wherein rotational speed of a mixer in stirrer mixing of starting components of the foam is a control variable.

12. The process according to claim 1, wherein at least one product property of the foam, which is located in a specific zone along the conveying direction, is predicted as a function of the actual surface temperatures.

13. The process according to claim 1, wherein foaming behavior is predicted as a function of the actual surface temperatures.

14. The process according to claim 12, wherein prediction is made by means of a regression model.

15. The process according to claim 12, wherein prediction is made by means of a neural network or a hybrid neural network.

16. The process according to claim 15, wherein at least the actual surface temperatures are input into a neural network as input parameters.

17. The process according to claim 12, wherein quality of the foam is classified based upon the at least one product property.

18. The process according to claim 17, wherein zones of the foam block which exhibit low quality are removed from the block.

* * * * *